(12) United States Patent
Baker et al.

(10) Patent No.: US 7,509,819 B2
(45) Date of Patent: Mar. 31, 2009

(54) OXYGEN-FIRED FRONT END FOR GLASS FORMING OPERATION

(75) Inventors: David J. Baker, Newark, OH (US); Harry P. Adams, Granville, OH (US); Christopher Q. Jian, Westerville, OH (US); William W. Toth, Newark, OH (US)

(73) Assignee: OCV Intellectual Capital, LLC DE (US)

( * ) Notice: Subject to any disclaimer, the term of this patent is extended or adjusted under 35 U.S.C. 154(b) by 454 days.

(21) Appl. No.: 10/116,432

(22) Filed: Apr. 4, 2002

(65) Prior Publication Data

US 2003/0188554 A1    Oct. 9, 2003

(51) Int. Cl.
*C03B 5/16* (2006.01)

(52) U.S. Cl. .................. 65/346; 65/347; 65/335; 65/179; 65/355; 432/247

(58) Field of Classification Search ............ 65/346, 65/347, 355, 337, 135, 136, 335, 356; 432/247
See application file for complete search history.

(56) References Cited

U.S. PATENT DOCUMENTS

| | | | |
|---|---|---|---|
| 3,525,604 A | 8/1970 | Van Dornick | |
| 3,552,949 A | 1/1971 | Boyle | |
| 3,592,623 A * | 7/1971 | Shepherd | 65/134.4 |
| 4,046,547 A * | 9/1977 | Pieper | 65/135.3 |

(Continued)

FOREIGN PATENT DOCUMENTS

DE    9206502    10/1992

(Continued)

OTHER PUBLICATIONS

Schnepper et al., "Coupled Combustion Space-Glass Bath Modeling of a Float Glass Melting Tank Using Full Oxy-Combustion," Advances in Fusion and Processing Glass II, Canada, Jul. 1997, pp. 219-224.

(Continued)

*Primary Examiner*—Mark Halpern
(74) *Attorney, Agent, or Firm*—James J. Dottavio; Kathryn W. Grant

(57) ABSTRACT

A front end for a glass forming operation comprises an open channel and at least one burner. The channel has at least one surface. The surface has at least one hole therein. The burner is oriented in the hole at an acute angle relative to the surface. In another embodiment of the invention, the channel has a top and a pair of sidewalls each having a surface. At least one hole is in at least one of the surfaces. The hole is at an acute angle relative to at least one surface. The burner is an oxygen-fired burner. In yet another embodiment of the invention, the top and sidewalls each have a super structure surface constructed of refractory material. The channel has an upstream end and a downstream end. At least one of the surfaces has a plurality of holes therein. The burners extend at an acute angle relative to at least one surface and in a plane extending between the upstream end and the downstream end and perpendicular to at least one surface. Oxygen-fired burners extend axially through corresponding holes.

31 Claims, 3 Drawing Sheets

U.S. PATENT DOCUMENTS

| | | | |
|---|---|---|---|
| 4,213,753 A * | 7/1980 | Negroni et al. | 432/247 |
| 4,473,388 A * | 9/1984 | Lauwers | 65/134.4 |
| 4,481,024 A | 11/1984 | Bly | |
| 4,540,361 A | 9/1985 | Gagne | |
| 4,604,123 A | 8/1986 | Desprez et al. | |
| 4,737,178 A | 4/1988 | Reifschneider et al. | |
| 4,944,785 A | 7/1990 | Sorg et al. | |
| 5,116,399 A | 5/1992 | Lauwers | |
| 5,139,558 A * | 8/1992 | Lauwers | 65/134.4 |
| 5,169,424 A | 12/1992 | Grinnen et al. | |
| 5,417,732 A | 5/1995 | Shamp et al. | |
| 5,500,030 A | 3/1996 | Joshi et al. | |
| 5,807,418 A | 9/1998 | Chamberland et al. | |
| 5,823,769 A * | 10/1998 | Joshi et al. | 432/181 |
| 5,925,165 A | 7/1999 | Pflugl et al. | |
| 5,934,899 A * | 8/1999 | Joshi et al. | 432/181 |
| 6,101,847 A | 8/2000 | Shamp et al. | |
| 6,109,062 A * | 8/2000 | Richards | 65/134.4 |
| 6,237,369 B1 | 5/2001 | LeBlanc et al. | |
| 6,442,041 B2 | 6/2002 | Simpson et al. | |
| 6,519,973 B1 | 2/2003 | Hoke et al. | |
| 6,705,118 B2 | 3/2004 | Simpson et al. | |
| 7,168,269 B2 | 1/2007 | Simpson et al. | |
| 2001/0039813 A1 * | 11/2001 | Simpson et al. | 65/134.4 |
| 2004/0131988 A1 | 7/2004 | Baker et al. | |
| 2006/0179886 A1 | 8/2006 | Adams et al. | |
| 2007/0119213 A1 | 5/2007 | Simpson et al. | |

FOREIGN PATENT DOCUMENTS

| | | |
|---|---|---|
| EP | 0 508 139 | 3/1992 |
| EP | 0 546 238 | 3/1992 |
| EP | 0 789 191 | 8/1997 |
| EP | 0 808 806 | 11/1997 |
| EP | 1 077 201 B1 | 11/2005 |
| GB | 325238 | 2/1930 |
| JP | 05078133 | 3/1993 |
| RU | 1836603 | 8/1993 |
| WO | WO 94/06724 | 3/1994 |
| WO | WO 02/092521 A1 | 11/2002 |
| WO | WO 03/084885 | 10/2003 |

OTHER PUBLICATIONS

Glass Making Today, edited by P.J. Doyle, Portcullis Press, first publication 1979, pp. 119-120.

A Modeling Study Comparing an Air- and Oxy-Fuel Fired Float Glass Melting Tank, International Congress on Glass, San Francisco, Jul. 1998.

* cited by examiner

OXYGEN-FIRED FRONT END FOR GLASS FORMING OPERATION

BACKGROUND OF THE INVENTION

This invention relates in general to forming operations and more particularly to a front end for use in forming operations. Most particularly, this invention relates to an oxygen-fired front end for use in glass forming operations.

In a forming operation, batch material is reduced to molten substance (e.g., molten glass) by passing the batch material through a melting furnace, which is commonly referred to as a melter. The molten glass is delivered downstream from the melter through a system of channels and forehearths. This system of channels and forehearths is referred to as a front end. The front end serves as a conduit to deliver the molten glass to one or more production points. The front end also serves to cool and condition the molten glass prior to reaching the production points. These production points are referred to as forming positions. Each forming position includes a bushing for fiber forming operation or a gob cutter for a container forming operation. Bushings or gob cutters are secured to the forehearths via a forehearth steel.

A conventional forehearth is provided with a firing system, which includes a plurality of burners. The burner functions to condition the molten glass G and maintain the molten glass G at a desired operational temperature. An example of a conventional forehearth 10 is shown in FIG. 1. The forehearth 10 includes a top or crown (not shown), a bottom (also not shown), and laterally spaced sidewalls 16. Portions of the forehearth 10 above the level of the molten glass G are constructed from super structure refractory. Portions of the forehearth 10 below the level of the molten glass G are constructed from contact refractory (i.e., glass contact refractory).

A plurality of holes 18 is drilled through the sidewalls 16. The holes 18 are drilled through the super structure of the forehearth 10. The holes 18 are drilled at a right angle relative to the sidewalls 16. The holes 18 are adapted to receive burners 20. The holes 18 are spaced about four to five inches from one another. Consequently, a large number of burners, manifolds, pipes, fittings and valves (not shown) are associated with air-gas mixture burners.

In a conventional firing system, a source of air and a source of gas pass through regulators. The air and gas are mixed and then passed through a system of pipes to a plurality of burners, typically 20 to 100 burners. The burners are typically air-gas mixture burners. That is to say, the burners use the air as an oxidant for the combustion of the gas to provide heat to a zone, commonly referred to as a control zone. The front end has between six and sixty control zones, each complete with a gas control safety and pressure reduction system, combustion air blowers, and valves and regulators capable of controlling the temperature of the molten glass G between the melter and the forming position.

An air-gas mixture firing system is not only costly to construct, it is inefficient to operate. An air-gas mixture firing system uses 30 to 75 cubic feet per hour of gas to heat a one-foot section of channel with an air-gas mixture. It requires about 10 cubic feet of air for combustion of 1 cubic foot of natural gas. The air must be heated from an ambient temperature to the same temperature as the exhaust gas stream. About 70 to 85 percent of the energy used heats the air to the exhaust gas temperature, leaving less than 15 to 30 percent of the energy to be transferred as available heat (i.e., heat available for the glass forming operation). Thus, an air-gas mixture firing system has minimum efficiency of combustion.

In addition to having a minimum efficiency of combustion, an air-gas mixture firing system is an inefficient means to heat the molten glass G. The flame temperature of an air-gas mixture burner in the air-gas mixture firing system reaches about 3500° F. However, the optical properties of the molten glass G and products of combustion limit the amount of radiant energy that penetrates the molten glass G. This causes the temperature gradient to be high vertically through the molten glass G. The only way to control the temperature distribution is to control the profile of the burners.

To overcome the deficiencies of an air-gas mixture firing system, the air-gas mixture burners have been replaced with concentric-type oxygen-gas mixture burners. A typical oxygen-gas firing system is supplied by BH-F)(ENGINEERING) LTD. of England. The system uses burners commonly referred to as oxygen-gas burners. Oxygen-gas burners use oxygen (e.g., typically 90 to 99 percent purity with an impurity being a combination of nitrogen and argon) in a high purity as an oxidant and fossil fuel for a combustible hydrocarbon supply. The oxygen-gas burner ignites the mixture of oxygen and gas at the point of ignition or combustion. The oxygen-gas burners are placed 4-5 inches apart, similar to the spacing to the air-gas mixture burners described above.

The oxygen-gas burners reduce $CO_2$ and $NO_x$ emissions, making these burners more environmentally friendly and possibly reducing greenhouse gas taxes. Oxygen-gas burners fire more efficiently by reducing the waste gas stream and providing more available heat for use in the glass forming operation. This holds true because an oxygen-gas burner requires less volume (i.e., 2 cubic feet) for combustion of 1 cubic foot of natural gas. Consequently, exhaust gases (i.e., the stream of gas used to heat the oxygen-gas mixture) are reduced by about 73 percent. As a result, about 65 percent of the energy in an oxygen-gas mixture firing system is used to transfer available heat.

In addition to having a greater efficiency of combustion, an oxygen-gas mixture firing system is a more efficient means to heat the molten glass. The flame temperature of an oxygen-gas burner is about 4500 to 4800° F. At this temperature, the flame and products of combustion radiate energy at wavelengths that the molten glass can absorb. This provides uniform glass temperature horizontally on the surface of the molten glass and vertically through the molten glass.

Although an oxygen-gas mixture firing system provides uniform glass temperature, it requires an extensive number of complex and costly components. For example, the current cost of an oxygen-gas burner is about $1000. A conventional oxygen-gas mixture system uses about six oxygen-gas burners per foot, resulting in a cost of about $6,000 per foot.

What is needed is a front end that reduces fuel consumption by using a low-cost system for firing forehearths with a combination of gas and oxygen.

SUMMARY OF THE INVENTION

The present invention is directed toward a front end for a glass forming operation. The front end comprises an open ended channel and at least one burner. The channel has at least one surface. The surface has at least one hole therein. The burner is oriented in the hole at an acute angle relative to the surface.

The present invention is also directed toward a front end comprising a channel having a top and a pair of sidewalls each having a surface. At least one hole is in at least one of the surfaces. The hole is at an acute angle relative to at least one surface. The burner is an oxygen-fired burner.

The present invention is further directed toward a front end comprising a channel having a top and sidewalls each having a super structure surface constructed of refractory material. The channel has an upstream end and a downstream end. At least one of the surfaces has a plurality of holes therein. The holes extend at an acute angle relative to at least one surface and in a plane extending between the upstream end and the downstream end and perpendicular to at least one surface. Oxygen-fired burners extend axially through corresponding holes.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
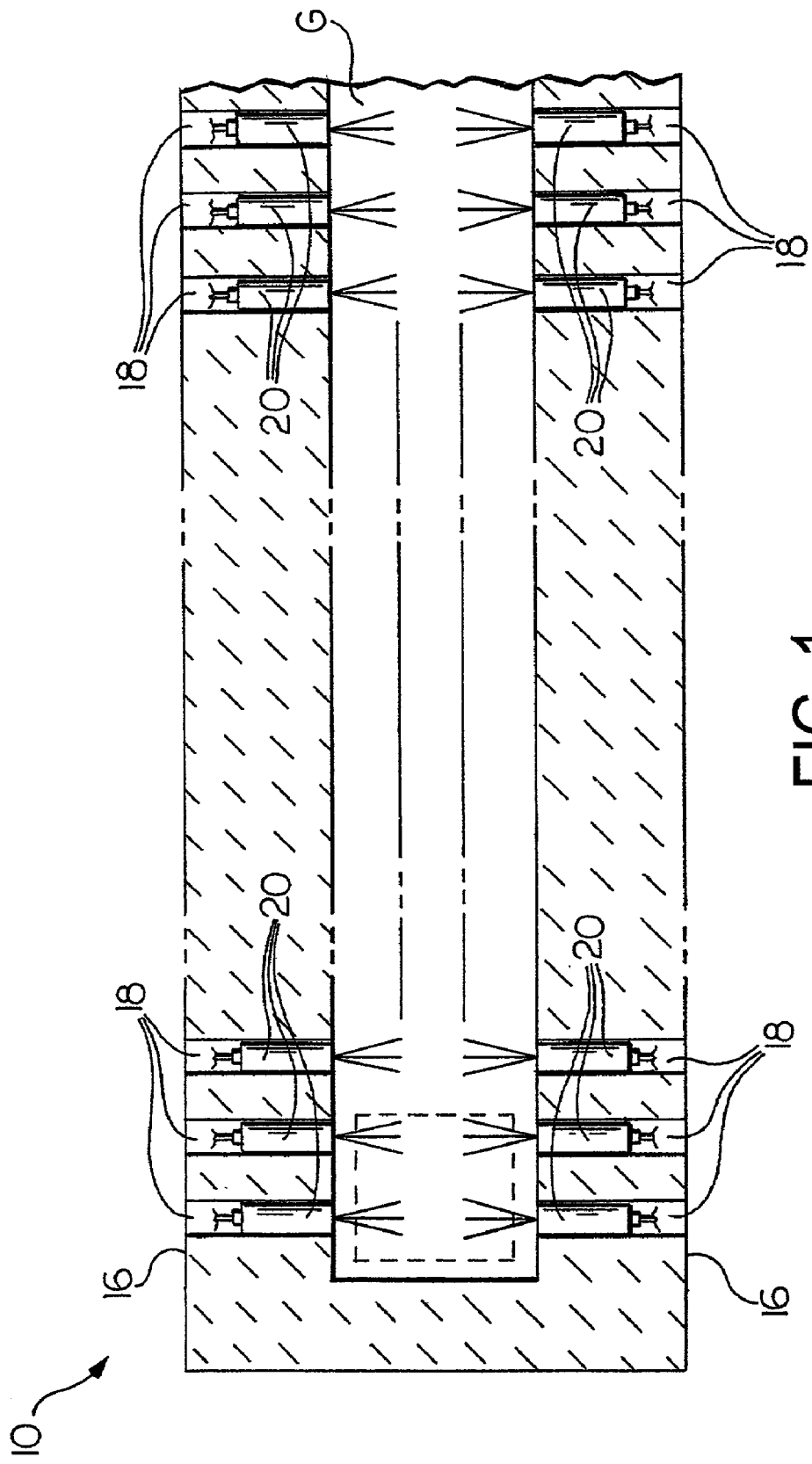
FIG. 1 is an environmental cross-sectional top plan view of a channel of a prior art front end.
Figure 2:
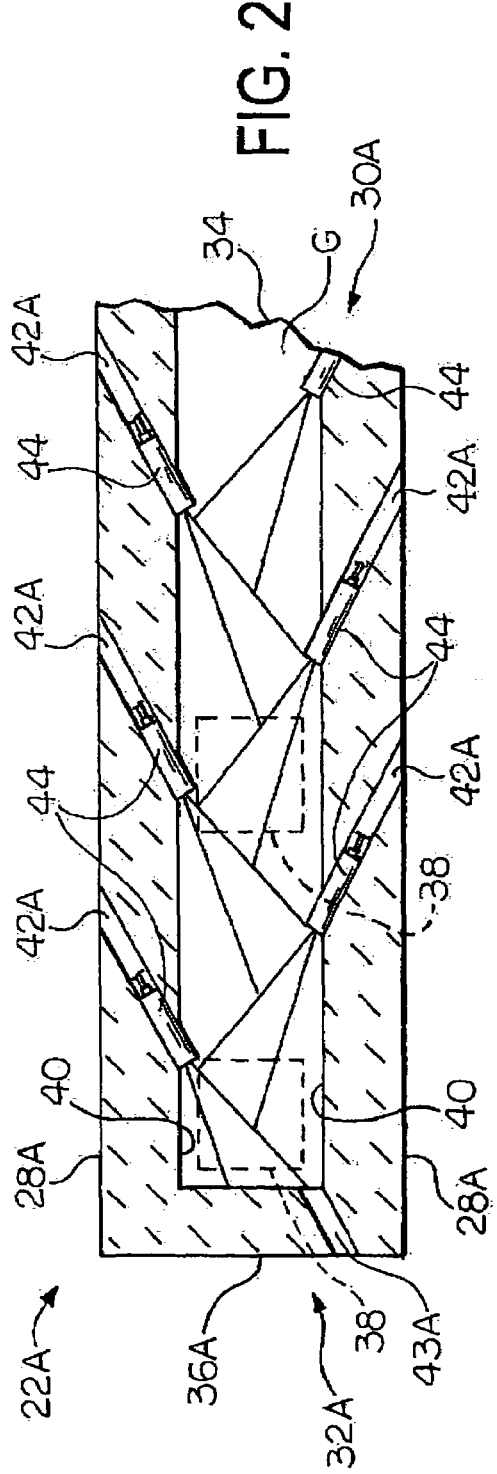
FIG. 2 is an environmental cross-sectional top plan view in cross-section of a channel according to one embodiment of the invention, wherein burners are alternatively spaced in the sidewalls of the channel.

Referring now to the drawings, there is illustrated in FIG. 2 a front end of a glass forming operation. The front end comprises an open channel and a forehearth downstream of the open channel. To simplify the description, the channel and forehearth will be cooperatively described as a channel 22A. The channel 22A is adapted to deliver molten substance (e.g., molten glass G) from a melter to a point of production (i.e., a forming position). Neither the melter nor the forming position is shown.

Molten glass G does not contact an upper portion of the channel 22A. That is to say, an upper portion of the channel 22A is above the molten glass level (i.e., the molten glass level L shown in FIGS. 4 and 5). Consequently, this portion can be constructed from relatively inexpensive refractory material (i.e., a super structure refractory material, such as silica, mullite, or other materials that are not required to withstand corrosive effects of molten glass G).

A lower portion of the channel 22A is below the glass level L and thus comes into contact with the molten glass G. Consequently, this portion of the channel 22A is constructed of a more costly glass contact refractory material. A ceramic refractory material (i.e., zircon, chromic oxide, or other suitable material) is a suitable glass contact refractory material because it can sustain the corrosive effects of molten glass G.

The channel 22A may comprise a top or crown (not shown), a bottom (also not shown), and sidewalls 28A. The channel 22A has an upstream end, generally indicated at 32A, and a downstream end, generally indicated at 30A. An open end 34 may be provided at the upstream end 32A of the channel 22A. An end wall 36A may be provided at the downstream end 32A of the channel 22A. One or more glass orifices 38 may be provided in the bottom of the channel 22A proximate, adjacent or close to the end wall 36A. The forehearth of the front end, as introduced above, is that portion of the channel 22A having the end wall 36A and the glass orifices 38 in the bottom.

The sidewalls 28A each define a surface 40. The surfaces 40 have at least one hole 42A therein. The hole 42A may be drilled in the super structure refractory material of existing front ends with a refractory core drill. New front ends can be constructed with built-in burner blocks having holes 42C formed therein (see FIG. 4). A burner 44 is provided in the hole 42A. In a preferred embodiment of the invention, a plurality of holes 42A is provided and a burner 44 is provided in each of the holes 42A. The burners 44 are preferably oxygen-fired burners, wherein oxygen (in high purity) and gas are mixed at a point of ignition or combustion. That is to say, the burners use oxygen as an oxidant and fossil fuel for a combustible hydrocarbon supply. Such burners are well known to those of ordinary skill in the art of the invention.

Figure 3:
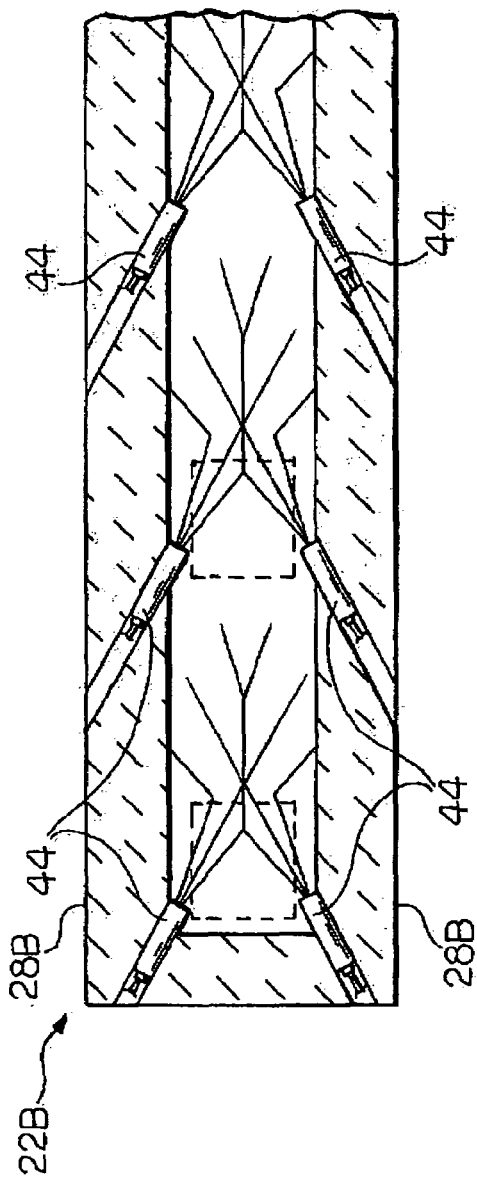
FIG. 3 is an environmental cross-sectional top plan view in cross-section of a channel according to another embodiment of the invention, wherein burners are spaced in pairs in the sidewalls of the channel.
Figure 4:
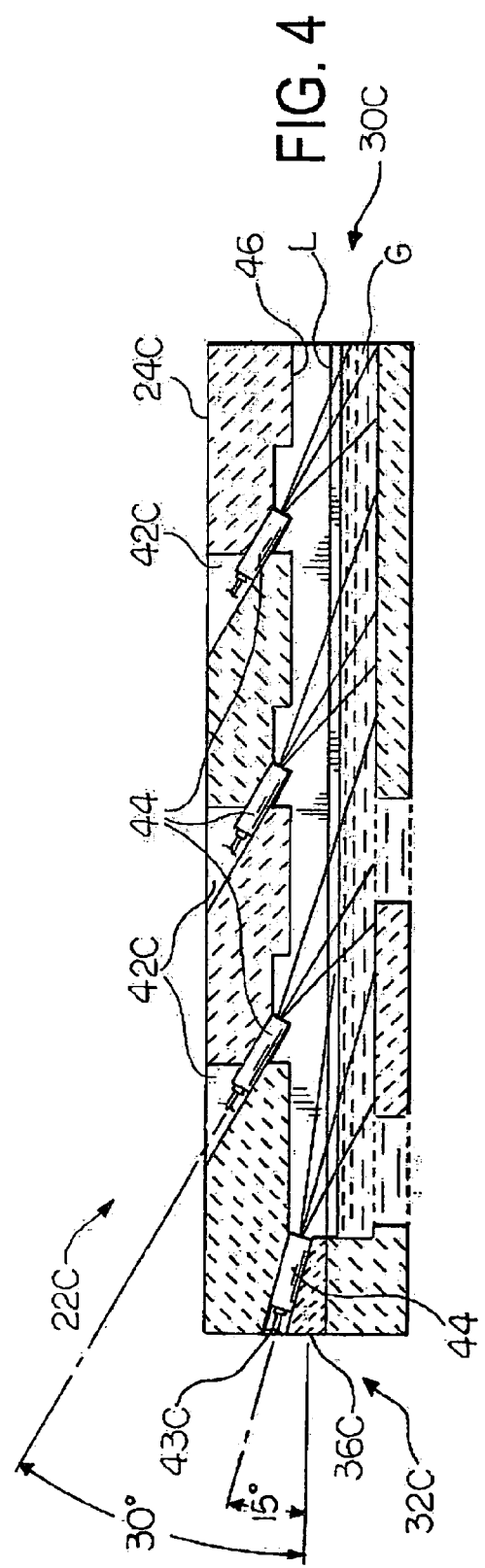
FIG. 4 is an environmental side elevational view in cross-section of a channel according to another embodiment of the invention, wherein burners sweep the top of the channel.
Figure 5:
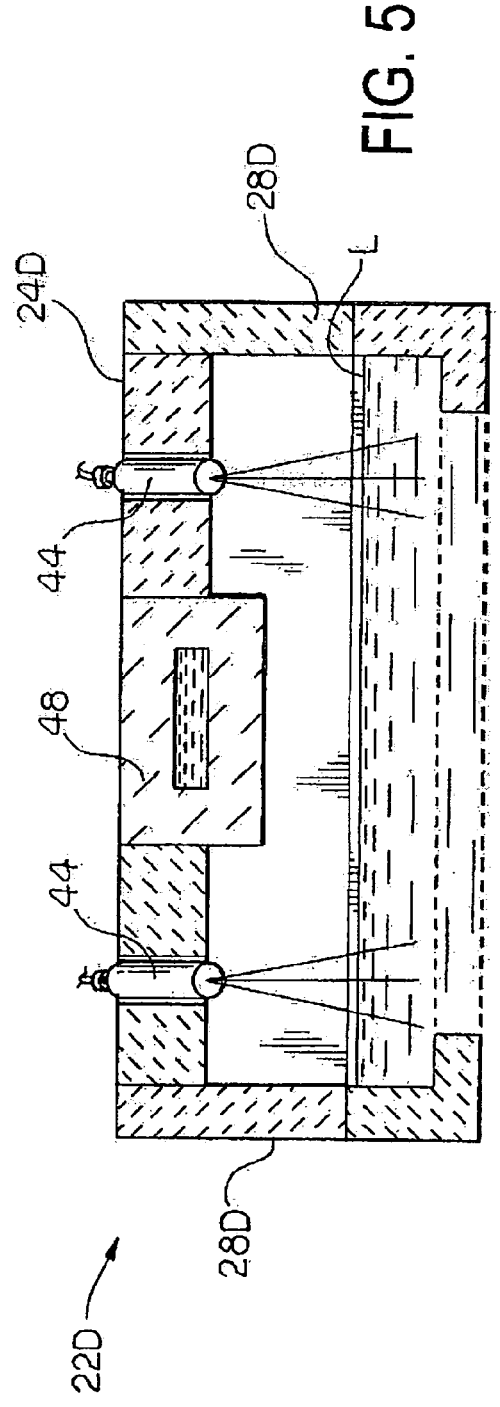
FIG. 5 is an environmental front elevational view in cross-section of a multi-zone channel according to yet another embodiment of the invention.

The burners 44 are positioned above the glass level L (shown in FIGS. 4 and 5). The burners 44 are oriented in a plane (e.g., a substantially horizontal plane) perpendicular to the surfaces 40 and at an acute angle relative to the surfaces 40. In FIG. 2, the burners 44 are pointed toward the downstream end 32A of the channel 22A at an angle between about 5 degrees to about 85 degrees relative to the surfaces 40, as shown in FIG. 2. Alternatively, as shown in FIG. 3, the burners 44 can be pointed toward the upstream end 30A of the channel 22A at an angle between about 95 degrees to about 175 degrees relative to the surfaces 40. This embodiment will be described in greater detail in the description hereinbelow.

Continuing with reference to FIG. 2, the burners 44 may be staggered or alternatively spaced so that opposing burners 44 in the opposing sidewalls 28A are laterally offset or do not laterally align (do not vertically align when viewing FIG. 2) with one another. The flame temperature of an oxygen-fired burner is about 4200-5200° F. However, the flame is preferably very small. Consequently, the flame does not directly contact the sidewalls 28A. However, heat radiating from the flame is quite substantial. Although the flame does not directly contact the sidewalls 28A, the sidewalls 28A are heated sufficiently by convection or heat otherwise radiating from the flame. This radiant heat is sufficient to properly condition the molten glass G and maintain the molten glass G at a desired temperature without compromising the integrity of the channel 22A by exposing the channel 22A to excessively high temperatures. This holds true even if the burners 44 are spaced about 1 foot to about 5 feet apart from one another.

Although not shown, it may be desirable to provide a hole 43A in the end wall 36A of the channel 22A. This hole 43A may be used as an exhaust hole or to support another burner 44 if more heat is needed in this region for conditioning the molten glass G or to maintain the molten glass G at a desired temperature.

Another embodiment of the invention is shown in FIG. 3. This embodiment is similar to the embodiment described above except the burners 44 are provided in pairs. In this embodiment of the invention, opposing burners 44 are not staggered or alternatively spaced. Instead, the opposing burners 44 are laterally aligned (vertically aligned when viewing FIG. 3) with one another. In this embodiment of the invention, more uniform distribution of heat may be provided.

In either of the foregoing embodiments of the invention, the burners 44 can be oriented so that the flames of opposing burners 44 cause one another to reflect toward the sidewalls 28A, 28B of the channel 22A, 22B. This is illustrated diagrammatically by the conical shaped pattern shown in FIG. 3. It should also be appreciated by one of ordinary skill in the art that the burners 44 in the foregoing embodiments could be angled downward. For example, the burners 44 could be angled downward at an angle in a range of about 0 degrees to about 20 degrees. As shown in FIG. 4, the angle can be about 30 degrees.

Another embodiment of the invention is illustrated in FIG. 4. The channel 22C according to this embodiment of the invention has a surface 46 defined by the top 24C of the channel 22C. This surface 46 has at least one hole 42C therein. A burner 44 is provided in the hole 42C. In a preferred embodiment of the invention, a plurality of holes 42C is provided and a burner 44 is provided in each of the holes 42C. The burners 44 are preferably oxygen-fired burners. As shown in FIG. 4, the oxygen-fired burners are arranged to supply substantially all the heat to the elongated channel to maintain the molten glass at a desired operational temperature.

The burners 44 are oriented in a plane (e.g., a substantially vertical plane) perpendicular to the surface 46 and at an acute angle relative to the surface 46. In a preferred embodiment of the invention, the burners 44 are pointed toward the upstream end 32A of the channel 22C at an angle between about 5 degrees to about 85 degrees relative to the surface 46, as shown in FIG. 4. Alternatively, the burners 44 can be pointed toward the downstream end 30A of the channel 22C at an angle between about 95 degrees to about 175 degrees relative to the surface 46.

As shown in the drawings, a hole 43C may be provided in the end wall 36C of the channel 22C. The hole 43C may be used as an exhaust vent for the channel 22C. In a preferred embodiment of the invention, this hole 43C is used to support another burner 44 if more heat is needed in this region for conditioning the molten glass G or to maintain the molten glass G at a desired temperature. Although, the burner 44 in the hole 43C in the end wall 36C is preferably oriented at an angle of about 15 degrees relative the top surface 46, as shown in FIG. 4, other angles may be suitable for carrying out the invention. For example, if the hole 43C is in the end wall 36C, the burner 44 can be at any angle ranging from about 5 degrees to about 90 degrees (or horizontal) relative to the end wall 36C. If the hole 43C is in the junction of the end wall 36C and the top surface 46, the burner 44 can be at any angle ranging from about 5 degrees to about 85 degrees relative to the end wall 36C.

Yet another embodiment of the invention is shown in FIG. 5. The channel 22D according to this embodiment of the invention is a hybrid channel having an intermediate cooling channel 48 and diametrically disposed burners 44. Although the burners 44 shown are provided in the top 24D of the channel 22D, the burners 44 may be provided in the sidewalls 28D. This embodiment of the invention is useful in wider firing zones where some cooling is desired, such as in glass container forming operations. Such operations typically require channels that measure about 5 feet wide.

In each of the foregoing embodiments of the invention, the burners 44 should be oriented so that the burner flame is not pushed into the top 24C, 24D or the sidewalls 28A, 28B, 28D. Moreover, the burners 44 should also be separated and the flame tempered so that excessive levels of heat are not reached within the channel 22A, 22B, 22C, 22D. This avoids the risk of overheating the top 24C, 24D, the sidewalls 28A, 28B, 28D, and/or the burner nozzle, resulting in damage to the refractory material or burners 44. As can be clearly seen in FIGS. 2, 3 and 4, the oxygen-fired burners 44 are oriented to direct flame and products of combustion in the direction of the length of channels 22A, 22B and 22C, respectively.

In each of the foregoing embodiments of the invention, the flow of oxygen is preferably about 20 to 200 cubic feet per hour for each burner 44. Any gas that requires this amount of flow for complete combustion may be suitable for carrying out the invention. The oxygen demand should be the same independent of the gas used.

The front end of the invention is advantageous because it uses fewer burners, fewer valves, fewer fittings, and a smaller number of associated manifolds and pipes. Firing is more efficient, therefore less fuel is consumed. Consequently, fuel pipe sizes are reduced. There is also a large reduction of pipe sizes for piping oxygen as opposed to air (e.g., from 8, 6, or 4 inch to 1 or 2 inch or smaller pipe). Installation costs are also reduced.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An oxygen-fired front end for use in glass forming operations, the front end comprising:
   a top wall, a bottom wall, and laterally spaced sidewalls, the top, bottom and side walls defining an elongated channel configured for the flow of molten glass in the direction of the length of the channel,
   the channel having an upstream end and a downstream end; and
   a plurality of oxygen-fired burners that are arranged to supply substantially all the heat to the elongated channel to maintain the molten glass at a desired operational temperature,
   the oxygen-fired burners being structured to substantially function without a source of air,
   the oxygen-fired burners being mounted to extend through the top wall and being oriented
   to direct flame and products of combustion at a downward acute angle relative to the top wall, and
   to direct the flame and products of combustion along the length of the channel,
   the angle being such that the burner flame does not directly contact the sidewalls.

2. The front end of claim 1 wherein the downward angle is an angle within the range of from about 0 degrees to about 20 degrees relative to the top wall.

3. The front end of claim 2 wherein the downward angle is an angle of about 15 degrees relative to the top wall.

4. The front end of claim 1 wherein the downward angle is an angle of about 30 degrees relative to the top wall.

5. The front end of claim 1 wherein the oxygen-fired burners mounted through the top wall are oriented at an acute angle relative to the sidewalls.

6. The front end of claim 1 in which the oxygen-fired burners are configured for providing a flame having a temperature of about 4500 degrees to about 4800 degrees F.

7. The front end of claim 1 including additional oxygen-fired burners that extend through the side walls and are mounted at an acute angle relative to the sidewalls.

8. The front end of claim 1 wherein the oxygen-fired burners are mounted through the top wall and are oriented at an acute angle relative to the top wall and sidewalls, and wherein the oxygen-fired burners are disposed for providing burner flame that does not contact the sidewalls, thereby precluding direct flame contact with the sidewalls.

9. The front end of claim 1 wherein upper portions of the front end are constructed from a super structure refractory material and lower portions of the front end are constructed from a contact refractory material suitable for contact with molten glass, wherein the super structure refractory material has a higher resistance to corrosion than the contact refractory material.

10. The front end of claim 1 wherein the oxygen-fired burners mounted through the top wall and oriented at an acute angle relative to the top wall are directed toward the upstream end.

11. The front end of claim 1, wherein the oxygen-fired burners are disposed for providing a flow of oxygen within the range of from about 20 to about 200 cubic feet per hour.

12. The front end of claim 1 wherein the oxygen-fired burners mounted through the top wall are oriented at an acute angle relative to the top wall, and wherein the oxygen-fired burners are disposed for providing burner flame that does not extend to an expected molten glass level that coincides with the surface of the expected molten glass in the channel.

13. The front end of claim 1, wherein the oxygen-fired burners mounted through the top wall and oriented at an acute angle relative to the top wall are directed toward the downstream end.

14. An oxygen-fired front end for use in glass forming operations, the front end comprising:
a top wall, a bottom wall, and laterally spaced sidewalls, the top, bottom and side walls defining an elongated channel configured for the flow of molten glass in the direction of the length of the channel, the channel having an upstream end and a downstream end;
a plurality of oxygen-fired burners that are arranged to supply substantially all the heat to the elongated channel to maintain the molten glass at a desired operational temperature,
the oxygen-fired burners being structured to substantially function without a source of air,
the oxygen-fired burners being mounted to extend through the top wall and configured to direct a flame having a temperature of about 4200 degrees to about 5200 degrees F., with the oxygen-fired burners being oriented to direct the flame and products of combustion along the length of the channel,
the oxygen-fired burners being oriented such that the burner flame does not directly contact the sidewalls; and
additional oxygen-fired burners mounted so that they extend through one of the sidewalls, the additional oxygen-fired burners oriented to direct flame and products of combustion at an acute angle relative to the sidewalls, the angle being such that the burner flame from the additional burners does not directly contact the sidewalls.

15. The front end of claim 14 wherein the downward angle is an angle within the range of from about 0 degrees to about 20 degrees relative to the top wall.

16. The front end of claim 15 wherein the downward angle is an angle of about 15 degrees relative to the top wall.

17. The front end of claim 14 wherein the downward angle is an angle of about 30 degrees relative to the top wall.

18. The front end of claim 14 wherein the oxygen-fired burners mounted through the top wall are oriented at an acute angle relative to the sidewalls.

19. The front end of claim 14 wherein the oxygen-fired burners mounted through the top wall and mounted through the sidewalls are oriented so that flame from the oxygen-fired burners does not contact the sidewalls, thereby precluding direct flame contact with the sidewalls.

20. The front end of claim 14, wherein the oxygen-fired burners mounted though the top wall and oriented at an acute angle relative to the top wall are directed toward the upstream end.

21. The front end of claim 14, wherein the oxygen-fired burners mounted through the top wall and oriented at an acute angle relative to the top wall are directed toward the downstream end.

22. An oxygen-fired front end for use in glass forming operations, the front end comprising:
a top wall, a bottom wall, and laterally spaced sidewalls, the top, bottom and side walls defining an elongated channel configured for the flow of molten glass in the direction of the length of the channel, the channel having an upstream end and a downstream end;
a plurality of oxygen-fired burners that are arranged to supply substantially all the heat to the elongated channel to maintain the molten glass at a desired operational temperature,
the oxygen-fired burners being structured to substantially function without a source of air,
the oxygen-fired burners being mounted so that they extend through the top wall,
the oxygen-fired burners oriented to direct flame and products of combustion at an acute angle relative to the sidewalls, with the oxygen-fired burners being oriented to direct the flame and products of combustion along the length of the channel; and
additional oxygen-fired burners that extend through the side walls and that are mounted at an acute angle relative to the sidewalls;
wherein the oxygen-fired burners are oriented so that flame from the oxygen-fired burners does not contact the sidewalls, thereby precluding direct flame contact with the sidewalls; and
wherein the oxygen-fired burners are directed toward the upstream end.

23. The front end of claim 22 wherein the downward angle is an angle within the range of from about 0 degrees to about 20 degrees relative to the top wall.

24. The front end of claim 23 wherein the downward angle is an angle of about 15 degrees relative to the top wall.

25. The front end of claim 22 wherein the downward angle is an angle of about 30 degrees relative to the top wall.

26. The front end of claim 22 in which the oxygen-fired burners are configured to direct a flame having a temperature of about 4200 to 5200° F.

27. The front end of claim 22, wherein the oxygen-fired burners mounted through the top wall and oriented at an acute angle relative to the top wall are directed toward the upstream end.

28. The front end of claim 22, wherein the oxygen-fired burners mounted through the top wall and oriented at an acute angle relative to the top wall are directed toward the downstream end.

29. An oxygen-fired front end for use in glass forming operations, the front end comprising: a top wall, a bottom wall, and laterally spaced sidewalls, the top, bottom and sidewalls defining an elongated channel configured for the flow of molten glass in the direction of the length of the channel, the channel having an upstream end and a downstream end; and
a plurality of oxygen-fired burners that are arranged to supply substantially all the heat to the elongated channel to maintain the molten glass at a desired operational temperature, the oxygen-fired burners being structured to substantially fraction without a source of air, the oxygen-fired burners being mounted to extend through the top wall and being oriented to direct flame and products of combustion at a downward acute angle relative to the surface of the expected molten glass in the channel, with the oxygen-fired burners being oriented to direct the flame and products of combustion along the length of the channel, the oxygen-fired burners are disposed to direct the burner flame whereby the burner flame does not directly contact the sidewalls.

30. The front end of claim 29 wherein the downward angle is an angle of about 30 degrees relative to the top wall.

31. The front end of claim 29 wherein the oxygen-fired burners are disposed for providing a flow of oxygen within the range of from about 20 to about 200 cubic feet per hour.

* * * * *